(12) United States Patent
Xu et al.

(10) Patent No.: US 10,652,809 B2
(45) Date of Patent: May 12, 2020

(54) METHOD AND APPARATUS FOR SUPPORTING NETWORK SLICING SELECTION AND AUTHORIZATION FOR NEW RADIO ACCESS TECHNOLOGY

(71) Applicant: LG ELECTRONICS INC., Seoul (KR)

(72) Inventors: Jian Xu, Seoul (KR); Seokjung Kim, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 71 days.

(21) Appl. No.: 15/593,926

(22) Filed: May 12, 2017

(65) Prior Publication Data

US 2017/0331785 A1 Nov. 16, 2017

Related U.S. Application Data

(60) Provisional application No. 62/336,739, filed on May 15, 2016, provisional application No. 62/352,023, filed on Jun. 20, 2016.

(51) Int. Cl.
*H04W 48/18* (2009.01)
*H04W 12/08* (2009.01)
*H04W 76/11* (2018.01)
*H04W 48/02* (2009.01)

(52) U.S. Cl.
CPC ........... *H04W 48/18* (2013.01); *H04W 12/08* (2013.01); *H04W 76/11* (2018.02); *H04W 48/02* (2013.01)

(58) Field of Classification Search
None
See application file for complete search history.

(56) References Cited

U.S. PATENT DOCUMENTS

| | | | |
|---|---|---|---|
| 2016/0352734 A1* | 12/2016 | Senarath | H04L 63/0892 |
| 2016/0353465 A1* | 12/2016 | Vrzic | H04W 12/06 |
| 2017/0142591 A1* | 5/2017 | Vrzic | H04W 24/08 |
| 2017/0332212 A1* | 11/2017 | Gage | H04W 4/70 |
| 2019/0021047 A1* | 1/2019 | Zong | H04W 76/11 |

OTHER PUBLICATIONS

3rd Generation Partnership Project, "Technical Specification Group Services and System Aspects; Study on Architecture for Next Generation System (Release 14)", 3GPP TR 23.799 V0.4.0, Apr. 2016, 96 pages.

* cited by examiner

*Primary Examiner* — Yaotang Wang
(74) *Attorney, Agent, or Firm* — Lee Hong Degerman Kang & Waimey

(57) ABSTRACT

For supporting selection/authorization of network slicing, a radio access network (RAN) node in a new radio access technology (RAT), e.g. gNB, receives a service request including slice information from a user equipment (UE), and determines a slice based on the slice information. The RAN node forwards the service request including the slice information to a common control plane function (C-CPF), and then, the C-CPF checks whether the UE is authorized for a specific slice. The RAN node receives a service response including an authorization indication for the specific slice from the C-CPF, and performs a corresponding action for the specific slice.

14 Claims, 9 Drawing Sheets

METHOD AND APPARATUS FOR SUPPORTING NETWORK SLICING SELECTION AND AUTHORIZATION FOR NEW RADIO ACCESS TECHNOLOGY

CROSS-REFERENCE TO RELATED APPLICATIONS

Pursuant to 35 U.S.C. § 119 (e), this application claims the benefit of U.S. Provisional Applications Nos. 62/336,739, filed on May 15, 2016 and 62/352,023, filed on Jun. 20, 2016, the contents of which are all hereby incorporated by reference herein in their entirety.

BACKGROUND OF THE INVENTION

Field of the Invention

The present invention relates to wireless communications, and more particularly, to a method and apparatus for supporting a network slicing selection and/or authorization for a new radio access technology (RAT) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. The NR system may be called another name, e.g. new radio access technology (RAT). 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the new RAT should be able to use any spectrum band ranging at least up to 100 GHz that may be made available for wireless communications even in a more distant future. The new RAT targets a single technical framework addressing all usage scenarios, requirements and deployment scenarios including enhanced mobile broadband (eMBB), massive machine-type-communications (mMTC), ultra-reliable and low latency communications (URLLC), etc. The new RAT shall be inherently forward compatible.

Initial work for gaining a common understanding on what is required in terms of radio protocol structure and architecture has been progressed, with focus on radio interface protocol architecture and procedures and radio access network architecture, interface protocols and procedures. This work shall cover at least the followings:

Study the feasibility of different options of splitting the architecture into a "central unit (CU)" and a "distributed unit (DU)", with potential interface in between, including transport, configuration and other required functional interactions between these nodes;

Study the alternative solutions with regard to signaling, orchestration . . . and operations, administration and maintenance (OAM), where applicable;

Study and outline the radio access network (RAN)-core network (CN) interface and functional split;

Study and identify the basic structure and operation of realization of RAN networks functions (NFs); Study to what extent it is feasible to standardize RAN NFs, the interfaces of RAN NFs and their interdependency;

Study and identify specification impacts of enabling the realization of network slicing;

Study and identify additional architecture requirements, e.g. support for quality of services (QoS) concept, self-organization network (SON), support of sidelink for device-to-device (D2D).

In the above listed items, features of network slicing should be supported in detail.

SUMMARY OF THE INVENTION

The present invention provides a method and apparatus for supporting a network slicing selection and/or authorization for a new radio access technology (RAT) in a wireless communication system. The present invention provides a solution for how a radio access network (RAN) node knows a final selected slice. The present invention also provides a solution for how a network authorizes a network slice that a user equipment (UE) has requested for a service.

In an aspect, a method for authorizing a network slice by a radio access network (RAN) node in a wireless communication system is provided. The method includes receiving a service request including slice information from a user equipment (UE), determining a slice based on the slice information, receiving a service response including an authorization indication for a specific slice from a common control plane function (C-CPF), and performing a corresponding action for the specific slice.

In another aspect, a radio access network (RAN) node in a wireless communication system is provided. The RAN node includes a memory, and a processor, coupled to the memory, that receives a service request including slice information from a user equipment (UE), determines a slice based on the slice information, receives a service response including an authorization indication for a specific slice from common control plane function (C-CPF), and performs a corresponding action for the specific slice.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
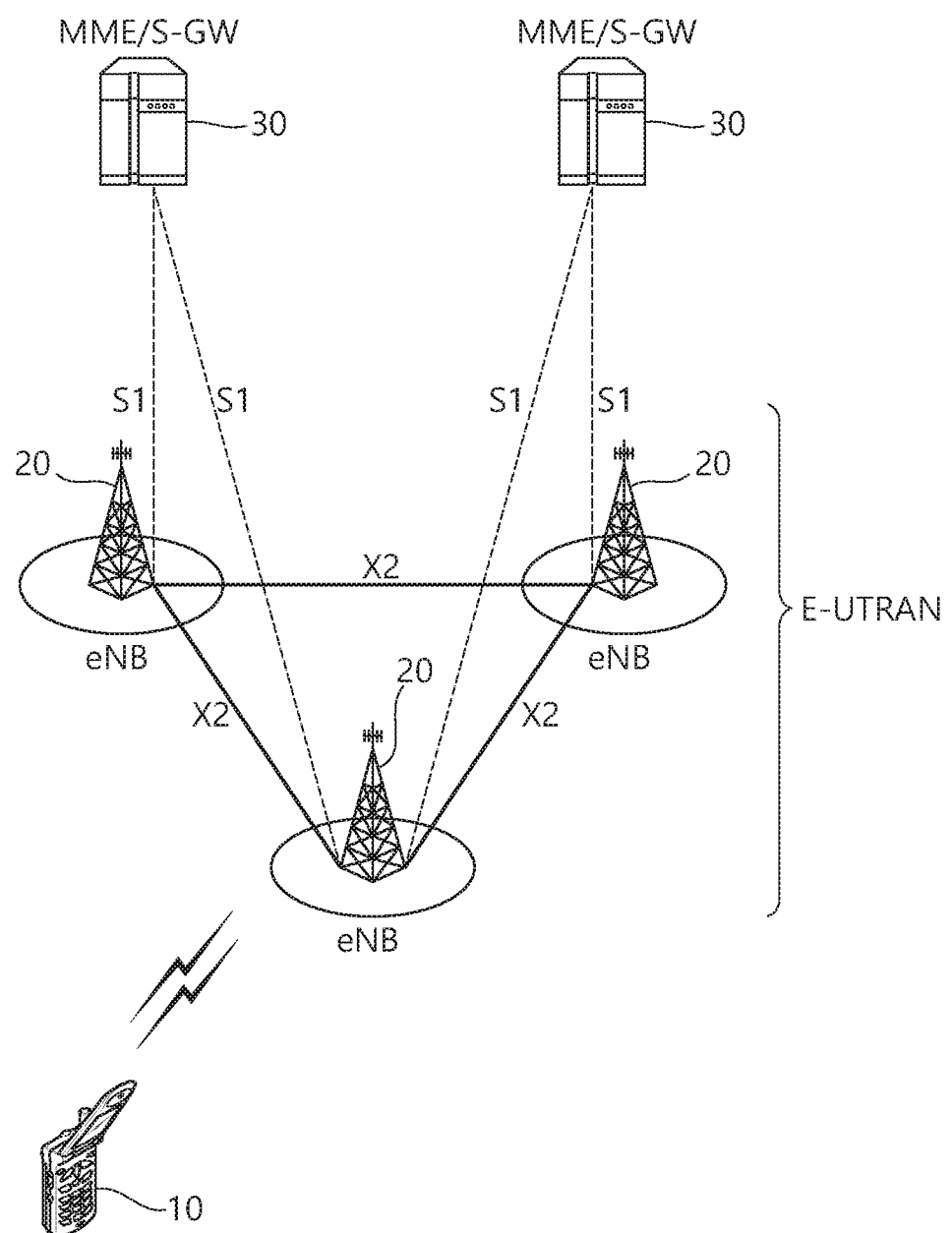
FIG. 1 shows LTE system architecture.

FIG. 1 shows LTE system architecture. Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

5G system is a 3GPP system consisting of 5G access network (AN), 5G core network (CN) and UE. 5G access network is an access network comprising a 5G radio access network (RAN) and/or non-3GPP access network connecting to a 5G core network. 5G core network connects to a 5G access network. 5G-RAN is a radio access network that supports one or more of the following options with the common characteristics that it connects to 5G core network:

1) Standalone new radio (NR).
2) NR is the anchor with E-UTRA extensions.
3) Standalone E-UTRA.
4) E-UTRA is the anchor with NR extensions.

As described above, the NR may be included in 5G system. The NR may be called another name, e.g. new radio access technology (RAT). The new RAT may be other system than LTE system, and may be used for specific usage, including enhanced mobile broadband (eMBB), massive machine-type-communications (mMTC), ultra-reliable and low latency communications (URLLC), etc.

One of key features of the new RAT may be support of network slicing. It may be referred to as Section 6.1.3 and Annex B of 3GPP TR 23.799 V0.4.0 (2016 April). Network slicing enables the operator to create networks customized to provide optimized solutions for different market scenarios which demands diverse requirements, e.g. in the areas of functionality, performance and isolation. A network slice is composed of all the network functions (NFs) that are required to provide the required telecommunication services and network capabilities, and the resources to run these NFs.

NF refers to processing functions in a network. This includes but is not limited to telecom nodes functionality, as well as switching functions e.g. Ethernet switching function, IP routing functions. That is, NF has defined functional behavior and interfaces. An NF can be implemented either as a network element on a dedicated hardware, or as a software instance running on a dedicated hardware, or as a virtualized function instantiated on an appropriate platform, e.g. on a cloud infrastructure. Virtual NF (VNF) is a virtualized version of a NF.

Network slicing concept consists of 3 layers: 1) service instance layer, 2) network slice instance layer, and 3) resource layer.

The service instance layer represents the services (end-user service or business services) which are to be supported. Each service is represented by a service instance. The service instance is an instance of an end-user service or a business service that is realized within or by a network slice. Typically services can be provided by the network operator or by 3rd parties. In line with this, a service instance can either represent an operator service or a 3rd party provided service.

A network operator uses a network slice blueprint to create a network slice instance. A network slice instance provides the network characteristics which are required by a service instance. A network slice instance is a set of NFs, and resources to run these NFs, forming a complete instantiated logical network to meet certain network characteristics required by the service instance(s):

- A network slice instance may be fully or partly, logically and/or physically, isolated from another network slice instance.
- The resources comprises of physical and logical resources.
- A network slice instance may be composed of sub-network instances, which as a special case may be shared by multiple network slice instances. The network slice instance is defined by a network slice blueprint.
- Instance-specific policies and configurations are required when creating a network slice instance.
- Network characteristics examples are ultra-low-latency, ultra-reliability etc.

A network slice instance may also be shared across multiple service instances provided by the network operator.

A network slice blueprint is a complete description of the structure, configuration and the plans/work flows for how to instantiate and control the network slice instance during its life cycle. A network slice blueprint enables the instantiation of a network slice, which provides certain network characteristics (e.g. ultra-low latency, ultra-reliability, value-added services for enterprises, etc.). A network slice blueprint refers to required physical and logical resources and/or to sub-network blueprint(s).

The network slice instance may be composed by none, one or more sub-network instances, which may be shared by another network slice instance. Similarly, the sub-network blueprint is used to create a sub-network instance to form a set of NFs, which run on the physical/logical resources. A sub-network instance comprises of a set of NFs and the resources for these NFs:

- The sub-network instance is defined by a sub-network blueprint.
- A sub-network instance is not required to form a complete logical network.
- A sub-network instance may be shared by two or more network slices.
- The resources comprises of physical and logical resources.
- The sub-network blueprint is a description of the structure (and contained components) and configuration of the sub-network instances and the plans/work flows for how to instantiate it. A sub-network blueprint refers to physical and logical resources and may refer to other sub-network blueprints.

Physical resource is a physical asset for computation, storage or transport including radio access. NFs are not regarded as resources.

Logical resource is partition of a physical resource, or grouping of multiple physical resources dedicated to a NF or shared between a set of NFs.

As one solution for network slicing, to enable a UE to simultaneously obtain services from multiple network slices of one network operator, a single set of C-Plane functions that are in common among core network instances is shared across multiple core network instances. Further, other C-Plane functions that are not in common reside in their respective core network instances, and are not shared with other core network instances.

Figure 2:
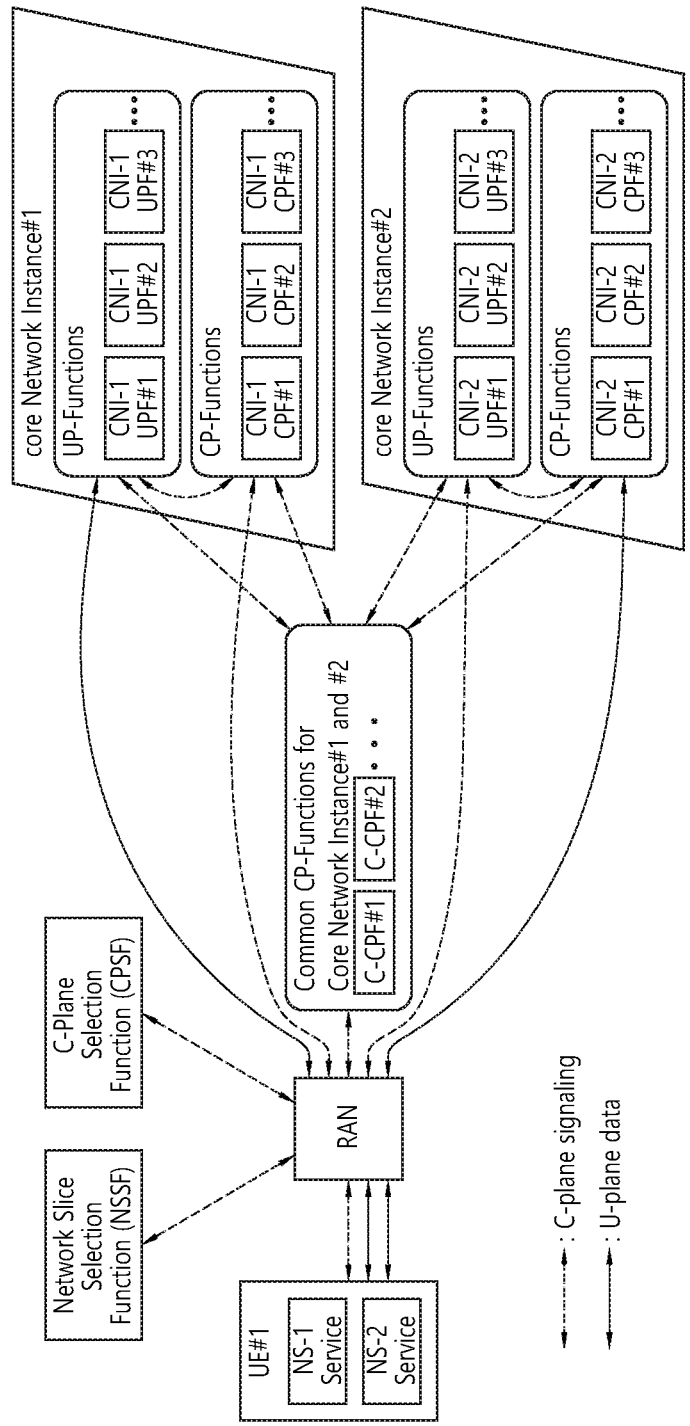
FIG. 2 shows an example of sharing a set of common C-plane functions among multiples core network instances.

FIG. 2 shows an example of sharing a set of common C-plane functions among multiples core network instances. The principles of the solution shown in FIG. 2 are as follows:

- A core network instance consists of a single set of C-Plane functions and a single set of U-Plane functions.
- A core network instance is dedicated for the UEs that are belonging to the same UE type. Identifying the UE type is done by using a specific parameter, e.g. the UE usage type, and/or an information from the UE's subscription.
- A set of C-Plane functions is responsible, for example, for supporting UE mobility if demanded or for admitting the UE into the network by performing authentication and subscription verification.
- All C-Plane functions that are common to multiple core network instances, are not necessary to be created multiple times.
- Other C-Plane functions that are not in common with other core network instances are only used by its own core network instance.
- A set of U-Plane functions in a core network instance is responsible for providing a specific service to the UE and for transports the U-Plane data of the specific service. For example, one set of U-Plane functions in core network instance #1 provides an enhanced mobile broadband service to the UE, whereas another set of U-Plane functions in core network instance #2 provides a critical communication service to the UE.
- Each UE can have multiple U-Plane connections to different sets of U-Plane function that are available at different core network instances simultaneously.
- The network slice selection function (NSSF) is responsible for selecting which core network instance to accommodate the UE by taking into account the UE's subscription and the specific parameter, e.g. the UE usage type.
- The C-Plane selection function (CPSF) is responsible for selecting which C-Plane functions within the selected core network instance that the base station should communicate with. This selection of C-Plane functions is done by using the specific parameter, e.g. UE usage type.

Figure 3:
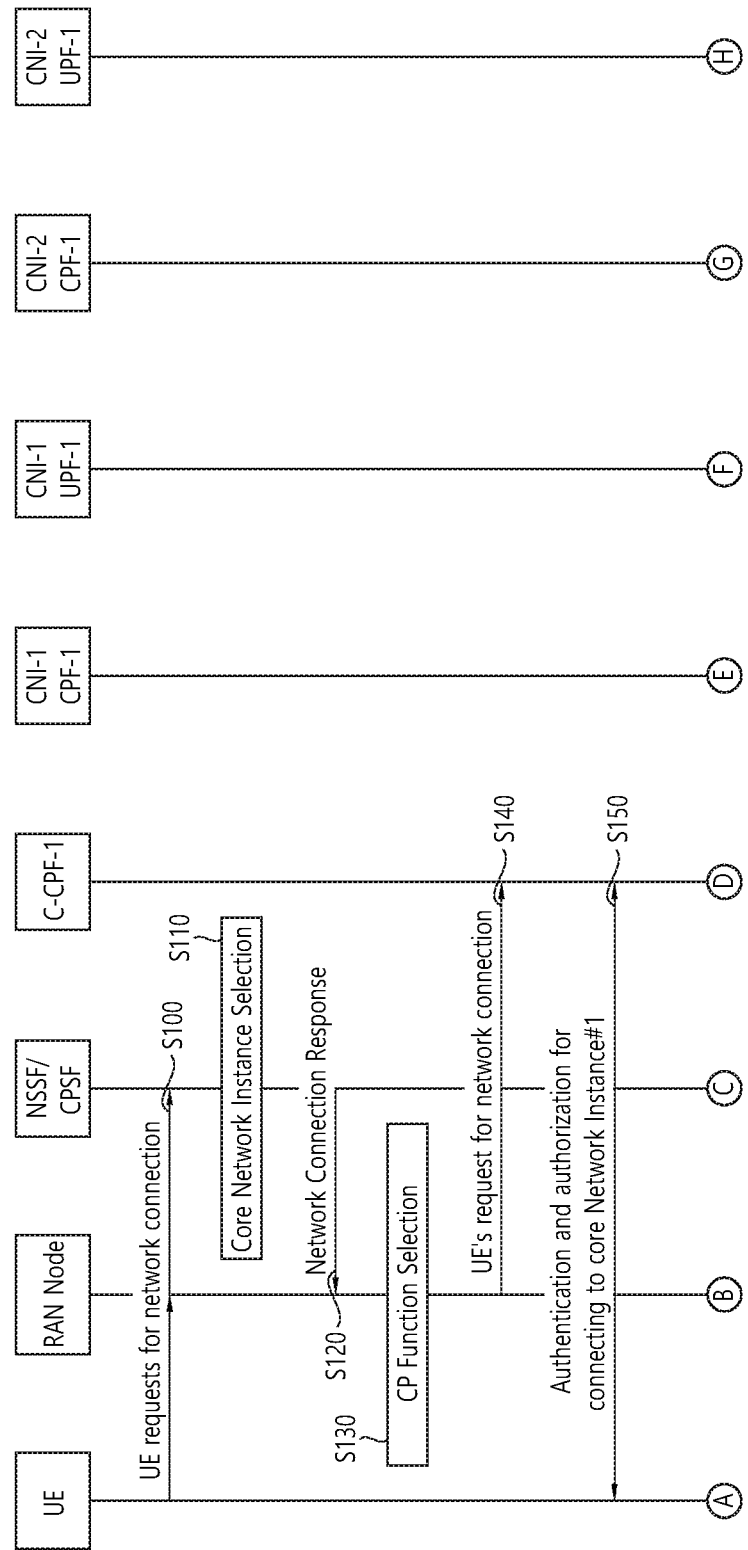
FIG. 3 and FIG. 4 show an example of signaling flow for supporting connections with multiple core network instances.
Figure 4:
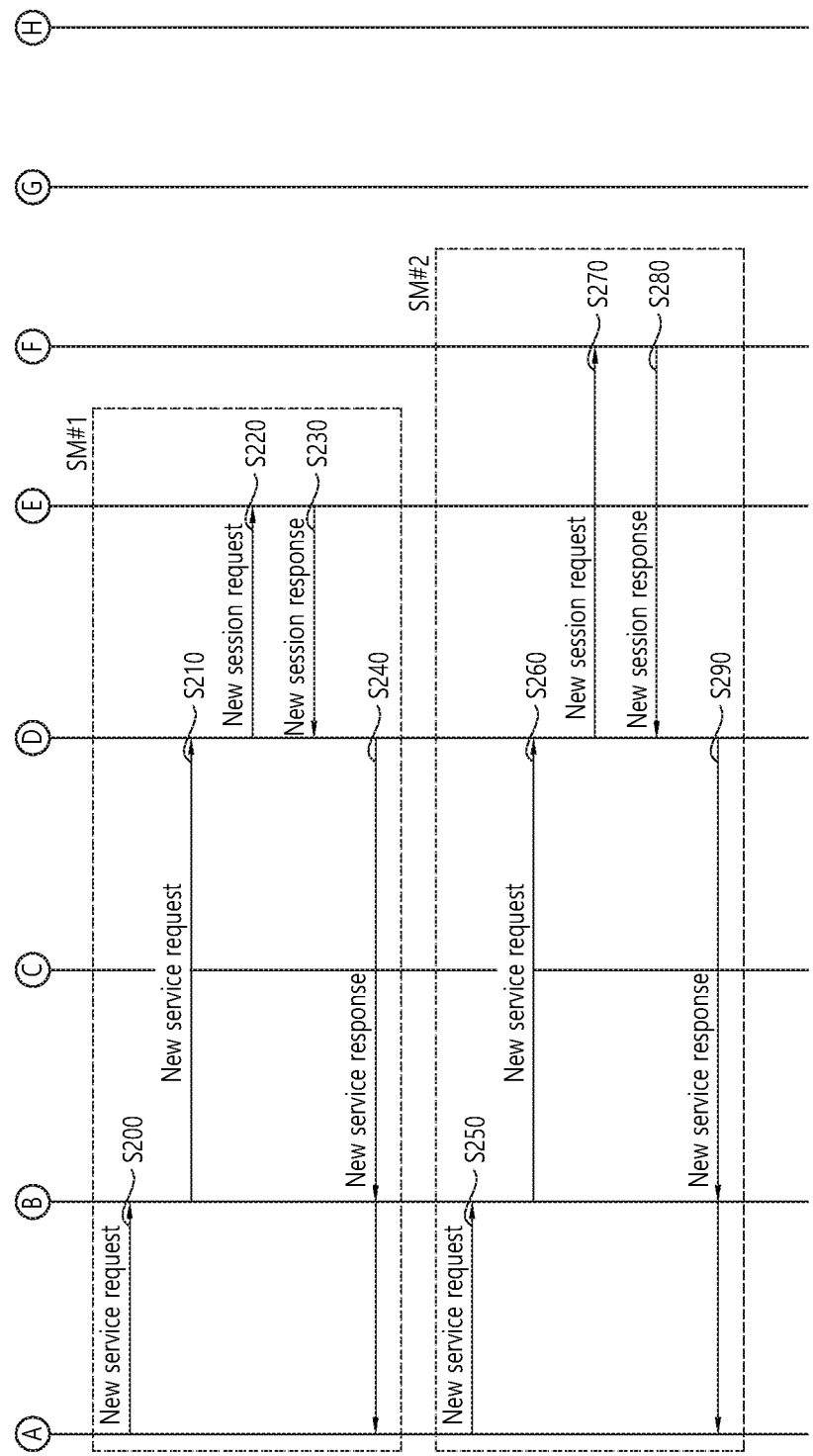

FIG. 3 and FIG. 4 show an example of signaling flow for supporting connections with multiple core network instances. FIG. 3 shows a mobility management (MM) attach procedure. FIG. 4 shows a session management (SM) procedure. The MM attach procedure shown in FIG. 3 is followed by the SM procedure shown in FIG. 4. In FIG. 3 and FIG. 4, a common C-Plane function (C-CPF) may be called other names, e.g. access and mobility management function (AMF). The CPF in the core network instance (i.e. CNI-1 CPF-1 or CNI-2 CPF-1) may be called other name, e.g. session management function (SMF).

Referring to FIG. 3, in step S100, when a UE first connects to the operator's network, the UE sends a network connection request to the RAN node. The RAN node may be a gNB, which may have the similar functions as the eNB in LTE. If the UE provides enough information to the RAN node to route the message to the appropriate core network instance and its corresponding C-Plane function, the RAN node routes this request to this C-Plane function. Hence, the flow continues in step S130 which will be described below. Otherwise, the RAN node forwards it to the NSSF/CPSF, and the flow continues in step S110.

In step S110, the NSSF/CPSF determines which core network instance and its corresponding C-Plane function(s) to be connected to by taking into account information in the request from a UE in step S100. In addition, other information from the subscription database may be also considered. In FIG. 3, this is the core network instance #1.

In step S120, the NSSF/CPSF sends a response to the RAN node with the C-Plane function(s) of the selected core network instance #1.

In step S130, based on the response sent in step S120, the RAN node selects a C-Plane function of the selected core network instance #1.

In step S140, the RAN node forwards the UE's network connection request to this C-CPF-1, which was the selected C-Plane function from steps S120 and S130.

In step S150, authentication and admitting the UE into the core network instance #1 is performed.

Referring to FIG. 4, which follows the FIG. 3, in step S200, the UE requests for a communication service (e.g. service #1 that is provided by the core network instance #1).

In step S210, the RAN node forwards the request for service to the C-CPF-1.

In step S220, the C-CPF-1 selects C-Plane function of the core network instance #1 and forwards the UE's request for the service #1 to this CPF-1 in core network instance #1 (i.e. CNI-1 CPF-1).

In step S230, after a successful session establishment, the CPF-1 in core network instance #1 sends the session response back to C-CPF-1.

In step S240, the C-CPF-1 sends a new service response back to the UE via the RAN node.

In step S250, the UE requests for a new communication service that is of a different service type than the previous service.

In step S260, the RAN node forwards the request for new communication service to the C-CPF-1.

In step S270, the C-CPF-1 selects C-Plane function of the core network instance #2 and forwards the UE's request for the new service to this CPF-1 in core network instance #2 (i.e. CNI-2 CPF-1).

In step S280, after a successful session establishment, the CPF-1 in core network instance #2 sends the session response back to C-CPF-1.

In step S290, the C-CPF-1 sends a new service response back to the UE via the RAN node.

Considering the architecture of FIG. 2 and procedure of FIG. 3 and FIG. 4, one issue needs to be solved may be about how the RAN node knows the final selected slice.

Figure 5:
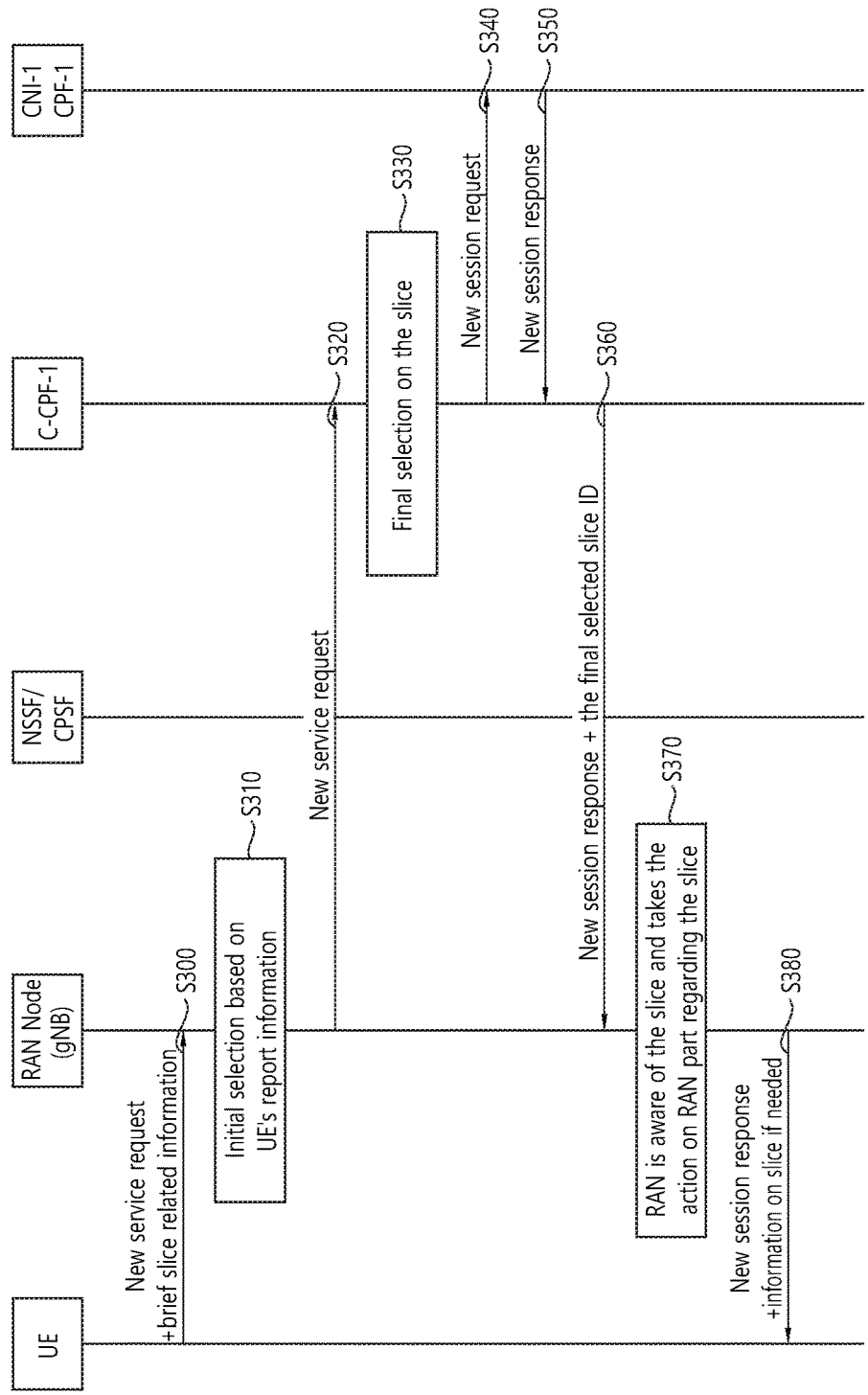
FIG. 5 shows a method for letting a RAN node know a final selected slice according to an embodiment of the present invention.

FIG. 5 shows a method for letting a RAN node know a final selected slice according to an embodiment of the present invention. This embodiment focuses on the SM procedure, which is about how the RAN node knows the final selected slice.

In step S300, the UE requests for a communication service (e.g. service #1 that is provided by the core network instance #1) to the RAN node, i.e. gNB. Together with the new service request, an indication on brief slice information may also be transmitted to the RAN node.

In step S310, based on the new service request and the indication on brief slice information from the UE, the RAN node initially selects the network slice. For example, the RAN node may decide whether to use C-CPF-1 or C-CPF-2.

In step S320, the RAN node forwards the corresponding service request to the NSSF/CPSF. The corresponding service request finally goes to the initially selected C-CPF-1. The NSSF/CPSF may be located inside of C-CPF.

In step S330, the C-CPF-1 selects the final slice to be used for this service based on the information configured or obtained from the core network instances.

In step 340, the C-CPF-1 transmits the new session request to the corresponding selected core network instance (e.g. core network instance #1).

In step S350, after a successful session establishment, the CPF-1 in core network instance #1 transmits the new session response back to the C-CPF-1.

In step S360, the C-CPF-1 puts an identification of the final selected slice into the new service response message and transmits it to the RAN node.

In step S370, by the receiving the identification of the final selected slice, the RAN node may aware the final selected slice. Accordingly, the RAN node may take the corresponding action for this slice from RAN point of view.

In step S380, the RAN node gives response back to the UE with information on slice if needed.

Furthermore, considering the architecture of FIG. 2 and procedure of FIG. 3 and FIG. 4, one more potential issue may be how the network authorizes the network slice that the UE has requested for a service.

Figure 6:
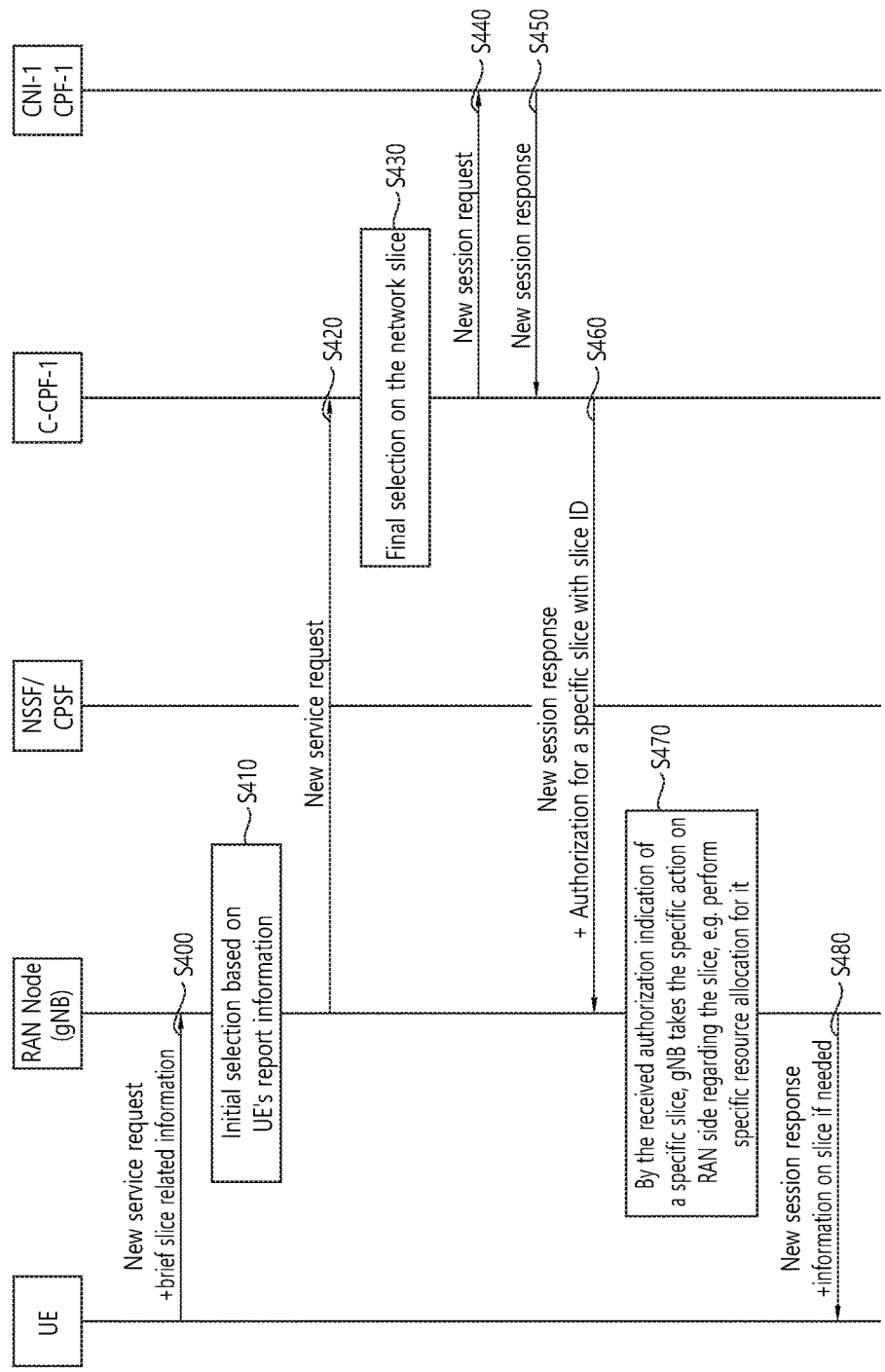
FIG. 6 shows a method for authorizing a network slice for session management procedure according to an embodiment of the present invention.

FIG. 6 shows a method for authorizing a network slice for session management procedure according to an embodiment of the present invention. In this embodiment, two step slice selection mechanism is used.

In step S400, the UE requests for a communication service (e.g. service #1 that is provided by the core network instance #1) to the RAN node, i.e. gNB. Together with the new service request, an indication on brief slice information may also be transmitted to the RAN node.

In step S410, based on the new service request and the indication on brief slice information from the UE, the RAN node initially selects the network slice. For example, the RAN node may decide whether to use C-CPF-1 or C-CPF-2.

In step S420, the RAN node forwards the corresponding service request to the NSSF/CPSF. The corresponding service request finally goes to the initially selected C-CPF-1. The NSSF/CPSF may be located inside of C-CPF. The corresponding service request may include the indication on brief slice information.

In step S430, the C-CPF-1 selects the final slice to be used (e.g. user plane gateway) for this service based on the information configured or obtained from the core network instances.

In step 440, the C-CPF-1 transmits the new session request to the corresponding selected core network instance (e.g. core network instance #1).

In step S450, after a successful session establishment, the CPF-1 in core network instance #1 transmits the new session response back to the C-CPF-1.

In step S460, the C-CPF-1 checks if the UE is authorized to use the specific network slice based on the subscription data and/or the UE capability. If the UE is authorized, the C-CPF-1 puts an authorization indication for a specific slice with a slice ID into the new service response message and transmits it to the RAN node.

In step S470, by the receiving the authorization indication for a specific slice, the RAN node may take the corresponding action for the specific slice from RAN point of view. For example, the RAN node may perform specific resource allocation scheme for the specific slice of this UE. Further, the RAN node may also store the authorization indication together with slice ID into the UE context for the specific slice.

In step S480, the RAN node gives response back to the UE with information on slice if needed.

Figure 7:
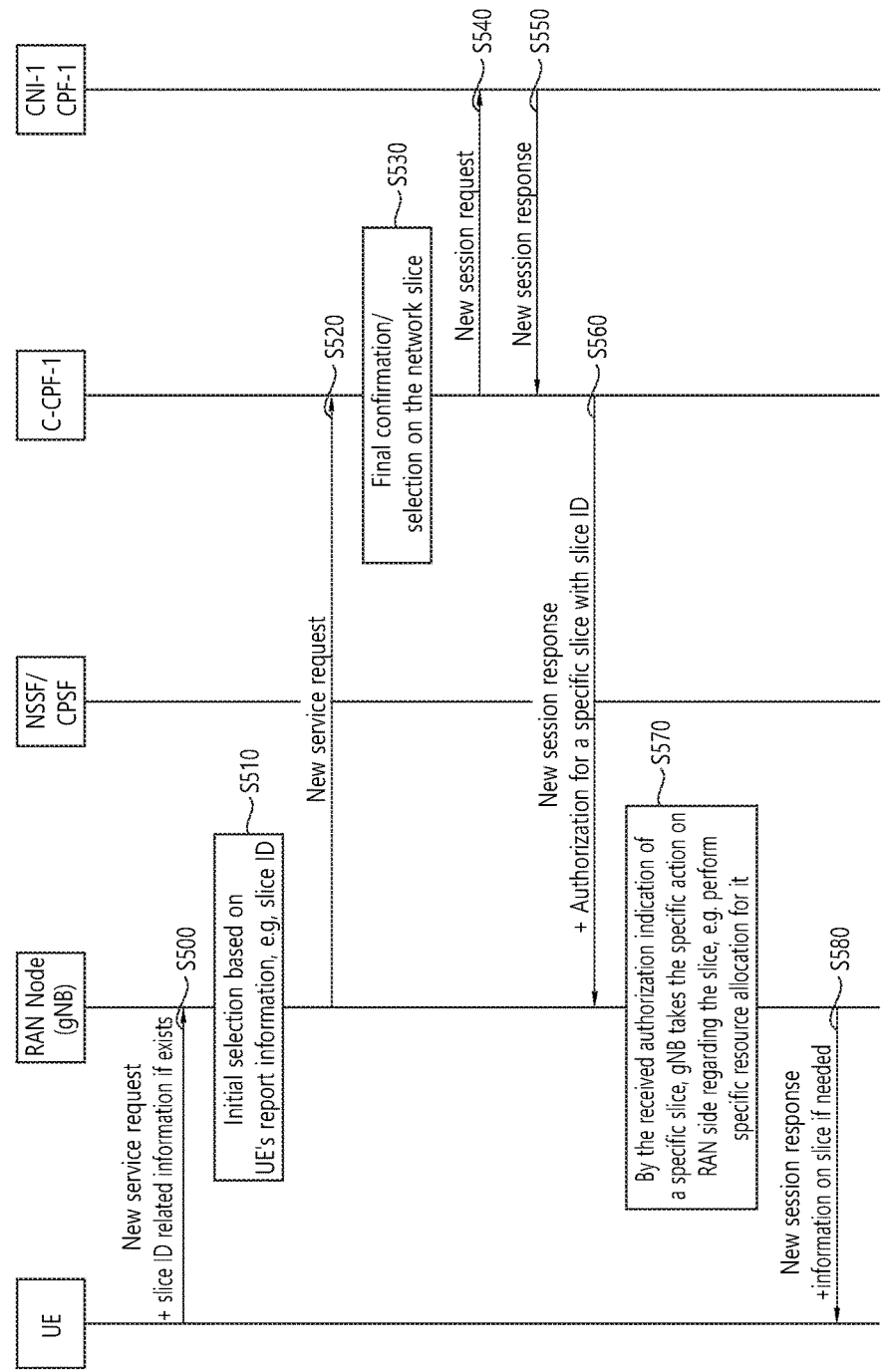
FIG. 7 shows a method for authorizing a network slice for session management procedure according to another embodiment of the present invention.

FIG. 7 shows a method for authorizing a network slice for session management procedure according to another embodiment of the present invention. In this embodiment, one step slice selection mechanism is used.

In step S500, the UE requests for a communication service (e.g. service #1 that is provided by the core network instance #1) to the RAN node, i.e. gNB. Together with the new service request, an indication on slice information may also be transmitted to the RAN node. The indication on slice information may be a slice ID.

In step S510, based on the new service request and the indication on slice information from the UE, the RAN node selects the network slice. For example, the RAN node may decide whether to use C-CPF-1 or C-CPF-2. Alternatively, by the slice ID received from the UE, the RAN node may decide the exact slice.

In step S520, the RAN node forwards the corresponding service request to the NSSF/CPSF. The corresponding service request finally goes to the selected C-CPF-1. The NSSF/CPSF may be located inside of C-CPF. The corresponding service request may include the indication on slice information, e.g. slice ID.

In step S530, the C-CPF-1 confirms the slice to be used (e.g. user plane gateway) for this service based on the information configured or obtained from the core network instances.

In step S540, the C-CPF-1 transmits the new session request to the corresponding selected core network instance (e.g. core network instance #1).

In step S550, after a successful session establishment, the CPF-1 in core network instance #1 transmits the new session response back to the C-CPF-1.

In step S560, the C-CPF-1 checks if the UE is authorized to use the specific network slice based on the subscription data and/or the UE capability. If the UE is authorized, the C-CPF-1 puts an authorization indication for a specific slice with a slice ID into the new service response message and transmits it to the RAN node.

In step S570, by the receiving the authorization indication for a specific slice, the RAN node may take the corresponding action for the specific slice from RAN point of view. For example, the RAN node may perform specific resource allocation scheme for the specific slice of this UE. Further, the RAN node may also store the authorization indication together with slice ID into the UE context for the specific slice.

In step S580, the RAN node gives response back to the UE with information on slice if needed.

Figure 8:
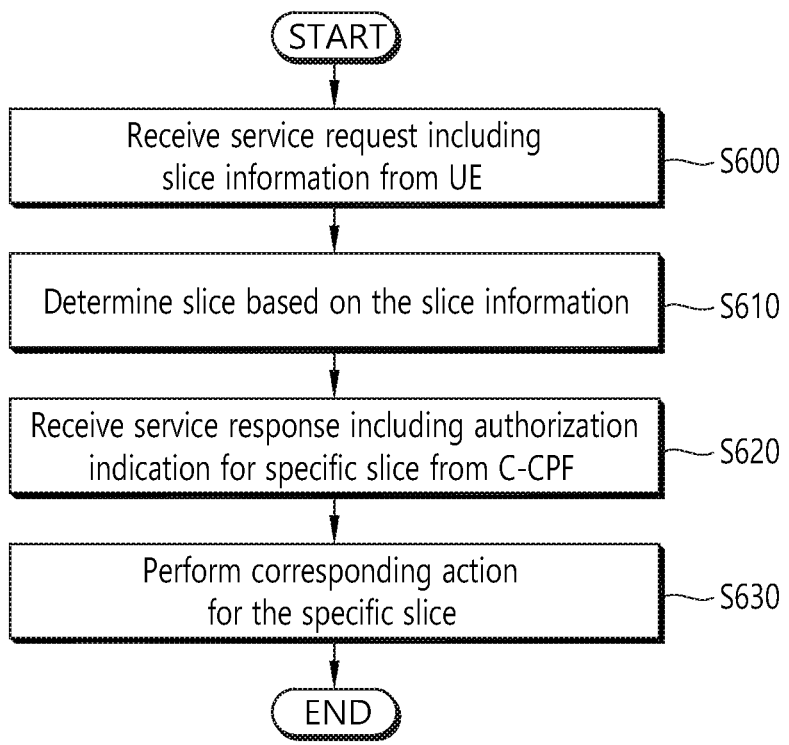
FIG. 8 shows a method for authorizing a network slice by a RAN node according to an embodiment of the present invention.

FIG. 8 shows a method for authorizing a network slice by a RAN node according to an embodiment of the present invention. The present invention described above may be applied to this embodiment. The RAN node may be a gNB in the new RAT.

In step S600, the RAN node receives a service request including slice information from a user equipment (UE). The slice information may be a slice ID.

In step S610, the RAN node determines a slice based on the slice information. The determining the slice may comprise determining which C-CPF to be used. Alternatively, the determining the slice may comprise determining the exact slice.

The RAN node may forward the service request including the slice information to a NSSF/CPSF. The NSSF/CPSF may be located inside of the C-CPF.

In step S620, the RAN node receives a service response including an authorization indication for a specific slice from the C-CPF. The authorization may be performed by the C-CPF. The service response may include a slice ID of the specific slice.

In step S630, the RAN node performs a corresponding action for the specific slice. For example, the RAN node may perform a specific resource allocation scheme for the specific slice. Or, the RAN node may store the authorization indication for the specific slice into a UE context.

The RAN node may transmit information on the specific slice to the UE.

Figure 9:
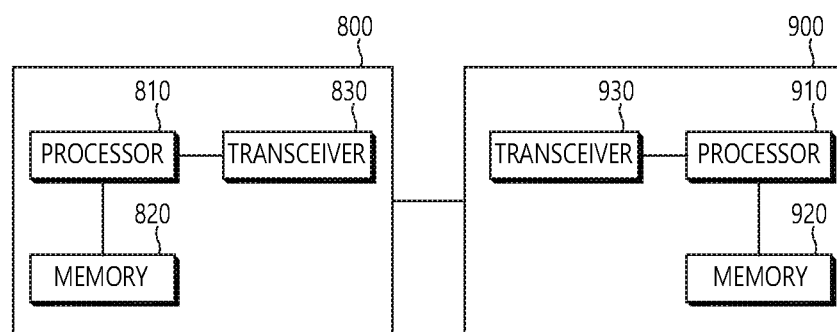
FIG. 9 shows a communication system to implement an embodiment of the present invention.

FIG. 9 shows a communication system to implement an embodiment of the present invention.

A first network node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A second network node 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, a network can authorize a network slice that a UE has requested for a service.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a radio access network (RAN) node in a wireless communication system, the method comprising:
   receiving a request for a service including slice information from a user equipment (UE);
   selecting a network slice among a plurality of network slices based on the slice information;
   forwarding the request to a common control plane function (C-CPF) related to the selected network slice;
   receiving a response for the service from the C-CPF when the selected network slice is determined by the C-CPF as a final network slice for the service, wherein the response includes authorization information for the selected network slice and a slice identifier (ID) of the selected network slice;
   performing an action related to the service for the selected network slice; and
   transmitting the slice ID of the selected network slice to the UE,
   wherein the C-CPF transmits a new session request to a CPF in a core network instance, in response to the selected network slice is determined as the final network, and the C-CPF receives a new session response after a successful session establishment from the CPF.

2. The method of claim 1, wherein the slice information includes the slice identifier (ID).

3. The method of claim 1, further comprising forwarding the request including the slice information to a network slice selection function (NSSF)/control plane selection function (CPSF).

4. The method of claim 3, wherein the NSSF/CPSF is located inside of the C-CPF.

5. The method of claim 1, wherein the performing action comprises performing a specific resource allocation scheme for the selected network slice.

6. The method of claim 1, wherein the performing the action comprises storing the authorization information for the selected network slice into a UE context.

7. The method of claim 1, wherein the RAN node is a gNB in a new radio access technology (RAT).

8. A radio access network (RAN) node in a wireless communication system, the RAN node comprising:
   a memory; and
   a processor, coupled to the memory, that:
   receives a request for a service including slice information from a user equipment (UE),
   selects a network slice among a plurality of network slices based on the slice information,
   forwards the request to a common control plane function (C-CPF) related to the selected network slice;
   receives a response for the service from the C-CPF when the selected network slice is determined by the C-CPF as a final network slice for the service, wherein the response includes authorization information for the selected network slice and a slice identifier (ID) of the selected network slice;
   performs an action related to the service for the selected network slice; and
   transmits the slice ID of the selected network slice to the UE,
   wherein the C-CPF transmits a new session request to a CPF in a core network instance, in response to the selected network slice is determined as the final network, and the C-CPF receives a new session response after a successful session establishment from the CPF.

9. The RAN node of claim 8, wherein the slice information includes the slice identifier (ID).

10. The RAN node of claim 8, wherein the processor further forwards the request including the slice information to a network slice selection function (NSSF)/control plane selection function (CPSF).

11. The RAN node of claim 10, wherein the NSSF/CPSF is located inside of the C-CPF.

12. The RAN node of claim 8, wherein the perform the action comprises perform a specific resource allocation scheme for the selected network slice.

13. The RAN node of claim 8, wherein the perform the action comprises store the authorization information for the selected network slice into a UE context.

14. The RAN node of claim 8, wherein the RAN node is a gNB in a new radio access technology (RAT).

* * * * *